United States Patent
Taguchi

(10) Patent No.: US 8,401,732 B2
(45) Date of Patent: Mar. 19, 2013

(54) VEHICLE CONTROL DEVICE AND VEHICLE CONTROL METHOD

(75) Inventor: Koji Taguchi, Isehara (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 252 days.

(21) Appl. No.: 12/740,436

(22) PCT Filed: Oct. 30, 2008

(86) PCT No.: PCT/JP2008/069776
§ 371 (c)(1),
(2), (4) Date: May 21, 2010

(87) PCT Pub. No.: WO2009/057701
PCT Pub. Date: May 7, 2009

(65) Prior Publication Data
US 2010/0241303 A1 Sep. 23, 2010

(30) Foreign Application Priority Data
Nov. 2, 2007 (JP) ................................. P2007-286471

(51) Int. Cl.
*G06F 7/00* (2006.01)

(52) U.S. Cl. ...................................... 701/31.4; 701/122

(58) Field of Classification Search .................... 701/41, 701/42, 71, 73, 94, 110, 121, 122, 497, 45; 340/435–437, 438; 180/447
See application file for complete search history.

(56) References Cited

U.S. PATENT DOCUMENTS

| 5,576,957 A | 11/1996 | Asanuma et al. |
| 5,892,463 A | 4/1999 | Hikita et al. |
| 6,122,585 A | 9/2000 | Ono et al. |
| 6,148,951 A * | 11/2000 | Nishi et al. ................... 180/446 |
| 6,321,159 B1 * | 11/2001 | Nohtomi et al. ................ 701/28 |

(Continued)

FOREIGN PATENT DOCUMENTS

| JP | A-1-296318 | 11/1989 |
| JP | A-4-339030 | 11/1992 |

(Continued)

OTHER PUBLICATIONS

Jan. 27, 2009 International Search Report issued in International Application No. PCT/JP2008/069776 (with English translation).

(Continued)

*Primary Examiner* — Thomas Black
*Assistant Examiner* — Marthe Marc-Coleman
(74) *Attorney, Agent, or Firm* — Oliff & Berridge, PLC

(57) ABSTRACT

Disclosed are a vehicle control device and a vehicle control method capable of performing appropriate traveling control while exhibiting the capability of a control system. Feedback control is performed according to a traveling target set in advance. At the time of the feedback control, when a vehicle traveling trace is deviated, when a tire friction circle is exceeded, or when a vehicle acceleration or a jerk exceeds a set value, if a control deviation exceeds a set value, a traveling target is regenerated. This enables appropriate traveling control while sufficiently exhibiting the capability of the control system until the control deviation exceeds the set value. When the control deviation exceeds the set value, a traveling target is regenerated, such that traveling control appropriate for the traveling environment can be performed.

2 Claims, 3 Drawing Sheets

U.S. PATENT DOCUMENTS

| | | | |
|---|---|---|---|
| 6,571,176 B1 | 5/2003 | Shinmura et al. | |
| 6,970,787 B2 * | 11/2005 | Matsumoto et al. | 701/301 |
| 7,529,600 B2 * | 5/2009 | Mori et al. | 701/1 |
| 2004/0158377 A1 | 8/2004 | Matsumoto et al. | |
| 2004/0193374 A1 | 9/2004 | Hac et al. | |
| 2005/0187684 A1 * | 8/2005 | Hijikata et al. | 701/45 |
| 2005/0267683 A1 | 12/2005 | Fujiwara et al. | |
| 2007/0021913 A1 * | 1/2007 | Heiniger et al. | 701/213 |

FOREIGN PATENT DOCUMENTS

| | | |
|---|---|---|
| JP | A-5-246267 | 9/1993 |
| JP | A-6-24346 | 2/1994 |
| JP | A-7-237557 | 9/1995 |
| JP | A-9-86378 | 3/1997 |
| JP | A-11-11292 | 1/1999 |
| JP | A-11-20499 | 1/1999 |
| JP | A-2000-177428 | 6/2000 |
| JP | A-2000-331299 | 11/2000 |
| JP | A-2001-255937 | 9/2001 |
| JP | A-2003-63430 | 3/2003 |
| JP | A-2003-175749 | 6/2003 |
| JP | A-2004-42148 | 2/2004 |
| JP | A-2004-243787 | 9/2004 |

OTHER PUBLICATIONS

Japanese Office Action dated Dec. 7, 2010 issued in Japanese Patent Application No. 2007-286471 (with translation).

Japanese Office Action dated Mar. 16, 2010 for Japanese Patent Application No. 2007-286471 (with translation).

Japanese Office Action dated Jan. 27, 2009 for Japanese Patent Application No. 2007-286471 (with translation).

International Preliminary Report on Patentability dated Jun. 1, 2010 for International Patent Application No. PCT/JP2008/069776 (with translation).

Extended European Search Report received Oct. 15, 2010 issued in European Patent Application No. 08844987.1.

* cited by examiner

VEHICLE CONTROL DEVICE AND VEHICLE CONTROL METHOD

TECHNICAL FIELD

The present invention relates to a vehicle control device and a vehicle control method which perform traveling control and the like of a vehicle.

BACKGROUND ART

In the related art, for movement control of a mobile object or the like, JP-A-2004-42148 describes a method that causes a mobile robot to autonomously move along a planned route, and when an obstacle is detected in the planned route, replans a route so as to avoid the obstacle.
[Patent Citation 1] JP-A-2004-42148

DISCLOSURE OF INVENTION

Technical Problem

According to such a control device and a control method, replanning is made when movement traveling is not carried out as planned. If replanning is quickly carried out even in the case such as when the mobile object strays from the route due to disturbance during movement traveling, there is a problem in that the original capability of a control system including feedback control and the like cannot be exhibited.

Accordingly, the invention has been finalized in order to solve such technical problems, and an object of the invention is to provide a vehicle control device and a vehicle control method capable of performing appropriate traveling control while sufficiently using the capability of a control system.

Technical Solution

A vehicle control device according to the invention includes a traveling control unit that performs feedback control for vehicle traveling according to a traveling target set in advance, a determination unit that determines whether a control deviation exceeds a set value or not at the time of the feedback control of the traveling control unit, and a target regeneration unit that, when the determination unit determines that the control deviation exceeds the set value, regenerates a traveling target.

According to this aspect, feedback control is performed for vehicle traveling according to a traveling target, and when the control deviation exceeds the set value at the time of the feedback control, a traveling target is regenerated. Therefore, traveling control can be performed while sufficiently exhibiting the capability of the control system until the control deviation exceeds the set value, and when the control deviation exceeds the set value, a traveling target is regenerated, such that traveling control appropriate for the traveling environment can be performed.

In the vehicle control device according to the invention, the determination unit may set the set value as a value so as to ensure vehicle traveling safety, and may determine whether the control deviation exceeds the set value or not at the time of the feedback control of the traveling control unit.

In the vehicle control device according to the invention, the determination unit may determine whether at least one of a vehicle position, a vehicle behavior, a vehicle acceleration, and a jerk as the control deviation exceeds the set value or not at the time of the feedback control of the traveling control unit.

A vehicle control method according to the invention includes a traveling control step of performing feedback control for vehicle traveling according to a traveling target set in advance, a determination step of determining whether a control deviation exceeds a set value or not at the time of the feedback control in the traveling control step, and a target regeneration step of, when it is determined in the determination step that the control deviation exceeds the set value, regenerating a traveling target.

According to the invention, feedback control is performed for vehicle traveling according to a traveling target, and when the control deviation exceeds the set value at the time of the feedback control, a traveling target is regenerated. Therefore, traveling control can be performed while sufficiently exhibiting the capability of the control system until the control deviation exceeds the set value, and when the control deviation exceeds the set value, a traveling target is regenerated, such that traveling control appropriate for the traveling environment can be performed.

Advantageous Effects

According to the invention, the capability of a control system can be sufficiently exhibited, and appropriate traveling control can be performed.

EXPLANATION OF REFERENCES

Figure 1:
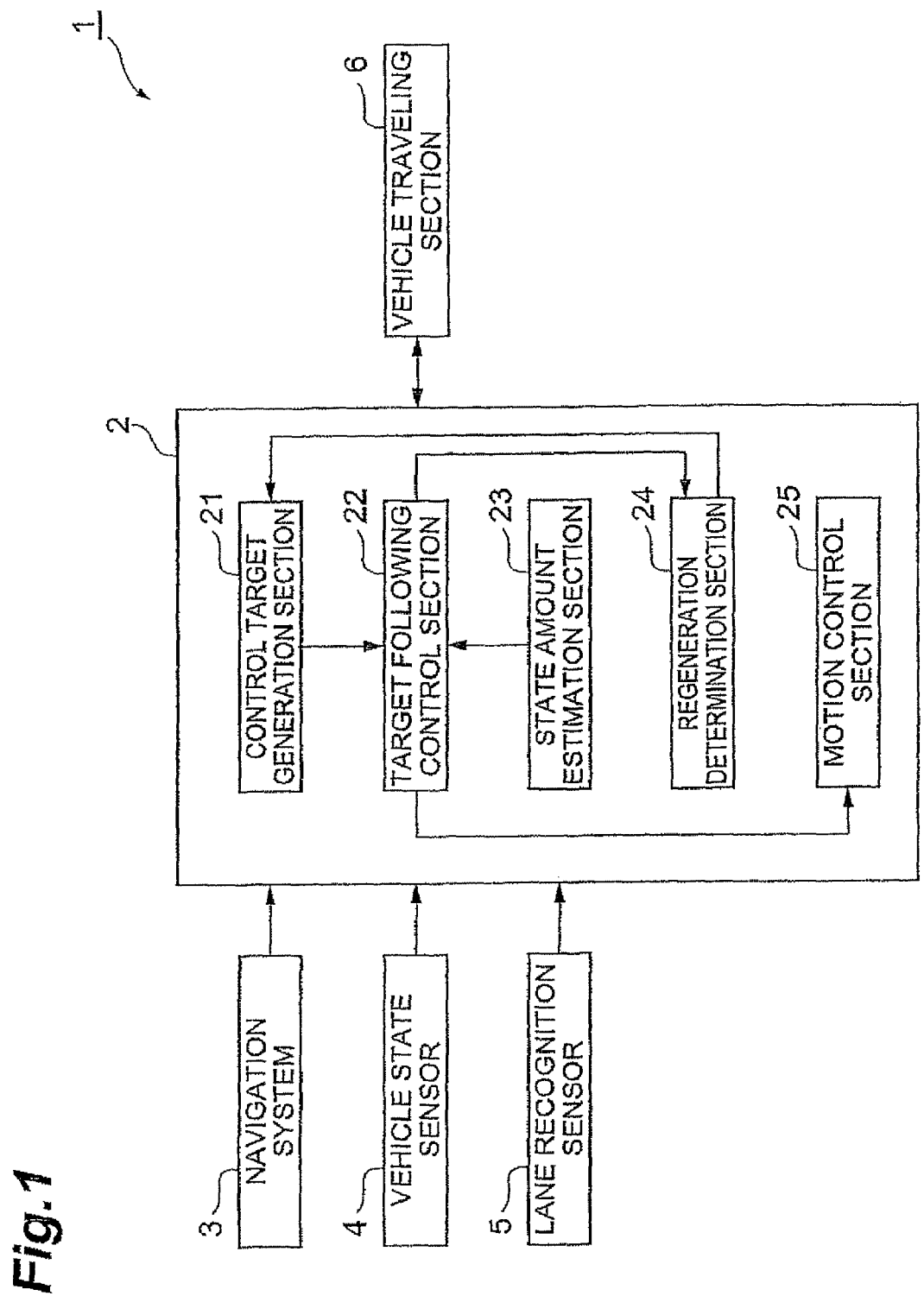
FIG. 1 is an outline configuration diagram of a vehicle control device according to an embodiment of the invention.

1: vehicle control device
2: ECU
3: navigation system
4: vehicle state sensor
5: lane recognition sensor
6: vehicle traveling section
21: control target generation section
22: target following control section
23: state amount estimation section
24: regeneration determination section
25: motion control section

BEST MODE FOR CARRYING OUT THE INVENTION

Hereinafter, an embodiment of the invention will be described with reference to the accompanying drawings. In the description of the drawings, the same elements are represented by the same reference numerals, and overlapping description will be omitted.

FIG. 1 is an outline configuration diagram of a vehicle control device according to an embodiment of the invention.

As shown in FIG. 1, a vehicle control device of this embodiment is mounted in a vehicle to perform traveling control of the vehicle, and is applied to an automatic driving system. The vehicle control device 1 includes an ECU 2. The ECU (Electronic Control Unit) 2 performs overall control of the vehicle control device 1, and primarily includes a computer having a CPU, a ROM, and a RAM, for example. FIG.

1 shows the functional configuration of the ECU 2. The constituent parts, such as the CPU, the ROM, and the RAM, are not shown.

The ECU 2 functions as a traveling control unit which performs feedback control for vehicle traveling according to a traveling target set in advance. The ECU 2 also functions as a determination unit which determines whether a control deviation exceeds a set value or not at the time of the traveling control of the vehicle. The ECU 2 also functions as a target regeneration unit which, when it is determined that the control deviation exceeds the set value, regenerates a traveling target.

The ECU 2 is provided with a control target generation section 21, a target following control section 22, a state amount estimation section 23, a regeneration determination section 24, and a motion control section 25. The control target generation section 21, the target following control section 22, the state amount estimation section 23, the regeneration determination section 24, and the motion control section 25 may function by loading a program on the CPU of the ECU 2 or may be implemented by providing hardware having individual functions.

The control target generation section 21 functions as a traveling target generation unit which generates a traveling target of the vehicle. For example, the control target generation section 21 generates a vehicle traveling trace and a vehicle speed pattern. The vehicle traveling trace is generated, for example, on the basis of road information recorded in the navigation system 3 and a road route or a destination set in advance. The vehicle speed pattern is generated, for example, on the basis of vehicle information. In this case, the vehicle information includes, for example, vehicle acceleration performance, vehicle deceleration performance, a vehicle weight, an allowable maximum acceleration, an allowable maximum deceleration, an allowable maximum jerk, a maximum speed, a maximum lateral acceleration, a maximum steering wheel angular velocity, a minimum normal speed, a minimum normal acceleration, a minimum normal jerk, emergency brake performance, a speed control error, a position control error, and the like. The vehicle speed pattern is preferably generated in consideration of an arrival time to a destination, fuel consumption of the vehicle, and the like.

The control target generation section 21 functions as a target regeneration unit which, when the regeneration determination section 24 determines that it is necessary to regenerate a traveling target for feedback control, regenerates the traveling target.

The target following control section 22 functions as a target following control unit which performs feedback control such that vehicle traveling follows the traveling target. For example, the target following control section 22 performs following control such that the vehicle travels in accordance with a traveling target generated by the control target generation section 21. The target following control section 22 receives a traveling target generated by the control target generation section 21 and a vehicle state and a traveling environment state estimated by the state amount estimation section 23, compares the traveling target with the vehicle traveling state, and outputs a control signal to the vehicle traveling section 6 through the motion control section 25 so as to reduce the control deviation. For the target following control section 22, for example, a control system using, for example, Linear Quadratic Integral (LQI) control or Proportional-Integral-Derivative (PID) control may be configured.

The state amount estimation section 23 estimates the vehicle state and the traveling environment state of the vehicle. For example, the state amount estimation section 23 estimates a vehicle position, a road surface $\mu$, and a yaw rate of the vehicle on the basis of information of the navigation system 3, the vehicle state sensor 4, the race recognition sensor 5, and the like.

The regeneration determination section 24 determines whether a control deviation of feedback control exceeds a set value or not during vehicle traveling, and when the control deviation of feedback control exceeds the set value, outputs a regeneration instruction signal for traveling target regeneration to the control target generation section 22.

In the regeneration determination section 24, for example, set values regarding the vehicle state, such as a vehicle position, deceleration, acceleration, a jerk, a yaw rate, and the like, are set, and when the control deviation of feedback control exceeds the set value, it is determined that it is necessary to regenerate a traveling target. With regard to the determination of whether the control deviation exceeds the set value or not, preferably, not only when the control deviation exceeds the set value once but also when the control deviation exceeds the set value a predetermined number of times within a predetermined time or a predetermined number of times successively, it is determined that the control deviation exceeds the set value. The set value is preferably set as a value capable of ensuring vehicle traveling safety. For example, with regard to the set value regarding the vehicle position, the set value is set as a limit value so as to ensure traveling safety from a target position. With regard to the set values regarding vehicle speed, acceleration, and jerk, the set values are respectively set as limit values so as to ensure traveling safety in accordance with vehicle situations.

The motion control section 25 outputs a drive control signal to the vehicle traveling section 6 to control vehicle traveling. For example, the motion control section 25 receives a control instruction signal output from the target following control section 22 and outputs a drive control signal.

The navigation system 3 has functions for storing road information on which the vehicle is traveling and for detecting the position of the vehicle. The navigation system 3 outputs position information of the vehicle to the ECU 2. The vehicle state sensor 4 is a sensor which acquires vehicle speed information of the vehicle and yaw rate information of the vehicle. The vehicle state sensor 4 includes a vehicle speed sensor, a yaw rate sensor, and the like.

The lane recognition sensor 5 is a sensor which acquires vehicle position information with respect to the lanes of the road. For example, the lane recognition sensor 5 includes an imaging device and an image processing device for processing images captured by the imaging device. A detection signal of the lane recognition sensor 5 is input to the ECU 2.

The vehicle traveling section 6 performs vehicle traveling. For example, the vehicle traveling section 6 includes a steering control ECU, an acceleration/deceleration control ECU, and the like. The vehicle traveling section 6 receives a drive control signal from the ECU 2 and appropriately outputs drive signal to a steering actuator, a throttle actuator of an engine, a brake actuator, and the like.

Next, the operation of the vehicle control device according to this embodiment and a vehicle control method according to this embodiment will be described.

The vehicle control device of this embodiment performs feedback control such that the vehicle travels in accordance with a traveling target generated by the ECU 2. As the traveling target, for example, a target traveling trace and a target speed pattern are set. The vehicle traveling state is detected by the navigation system 3, the vehicle state sensor 4, and the lane recognition sensor 5 as needed. The ECU 2 confirms whether the vehicle is traveling in accordance with the traveling target or not, and when the vehicle traveling state has a deviation (control deviation) with respect to the traveling target, outputs a drive control signal to the vehicle traveling section 6 so as to reduce the deviation.

When vehicle traveling is not carried out in accordance with the traveling target due to disturbance at the time of feedback control, and when the control deviation exceeds the set value at the time of the feedback control, a new traveling target is regenerated, and feedback control is performed in accordance with the new traveling target to carry out vehicle traveling.

At this time, prediction of whether the control deviation will exceed the set value or not at the time of feedback control is preferably made by a vehicle model constructed in the ECU 2. That is, predicted disturbance is applied to the vehicle model, and a future vehicle traveling state is supposed. Then, it is determined whether the control deviation at that time exceeds the set value, and when the control deviation exceeds the set value, a new traveling target is generated.

Figure 2:
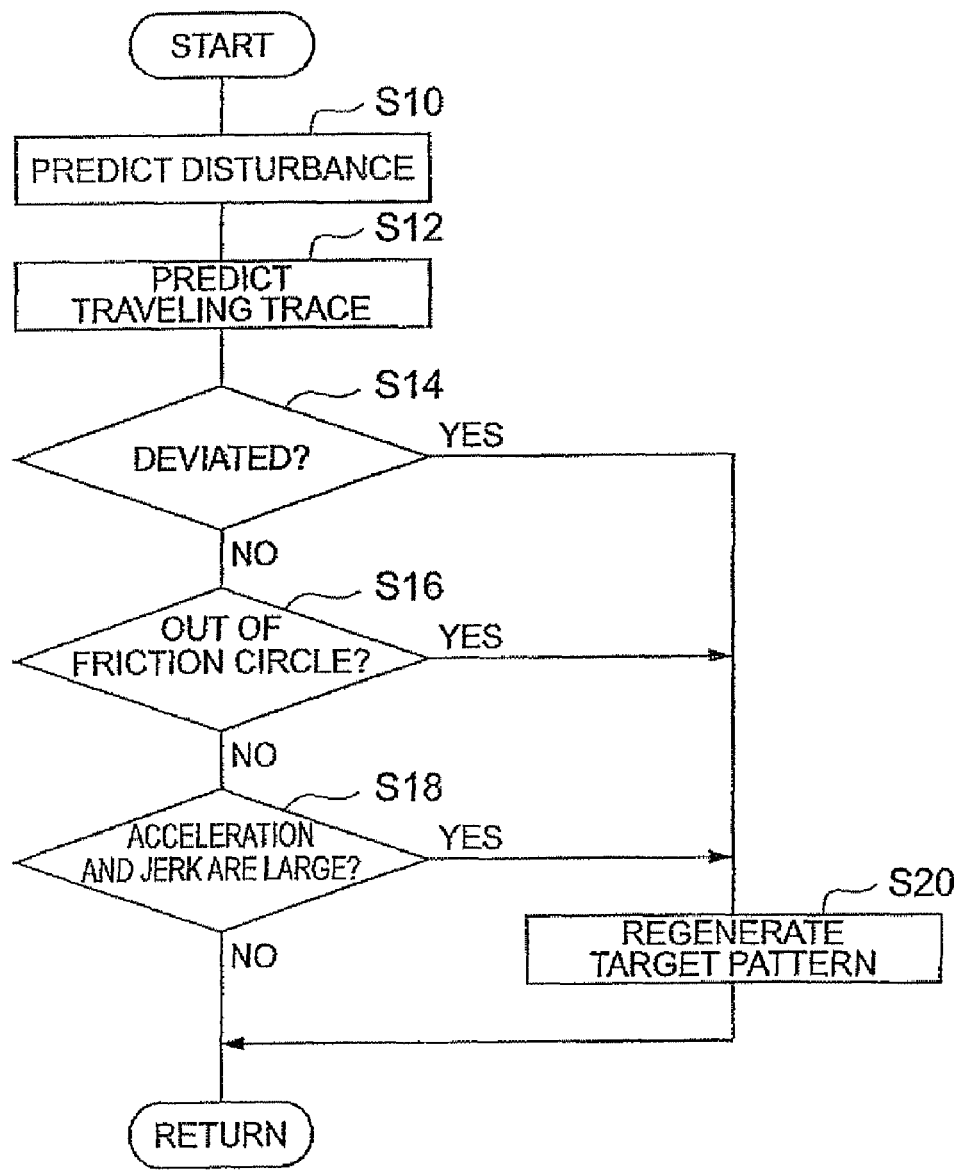
FIG. 2 is a flowchart showing the operation of the vehicle control device of FIG. 1 and a vehicle control method.

FIG. 2 is a flowchart showing an example of the operation of the vehicle control device according to this embodiment and a vehicle control method according to this embodiment. For example, control processing of FIG. 2 is repeatedly carried out in a predetermined cycle by the ECU 2.

First, as shown in S10 of FIG. 2, disturbance prediction processing is carried out. The disturbance prediction processing is processing for predicting disturbance at the time of vehicle traveling control. For example, the average value of the past control deviations is calculated and set as normal disturbance b. Then, the average variation of the control deviations is calculated and set as increased disturbance a. At this time, as the past control deviations, the control deviations for multiple times (for example, five times) in the past control cycle are used. Then, a predicted value Err(t) of disturbance at the time t is calculated by Equation (1).

$$Err(t)=a \cdot t+b \tag{1}$$

Then, the process progresses to S12, and traveling trace prediction processing is carried out. The traveling trace prediction processing is processing for predicting the traveling trace of the vehicle when the vehicle undergoes disturbance. For example, the traveling trace of the vehicle when the disturbance value Err(t) predicted in S10 is received is predicted. This prediction processing may be carried out by a control simulation using a steering control system set in the ECU 2, road alignment, and the like.

Then, the process progresses to S14, and it is determined whether the vehicle is deviated from the road or not. For example, when the traveling trace of the vehicle is deviated from the lanes of the road, it is determined that the vehicle is deviated from the road. When it is determined in S14 that the vehicle is not deviated from the road, it is determined whether the front-back or left-right G of the vehicle behavior exceeds a tire friction circle or not (S16). For example, it is determined whether the acceleration in the front-back direction and the acceleration in the left-right direction of the vehicle exceed a tire friction circle set in advance or not. The determination of whether the front-back or left-right G of the vehicle behavior exceeds the tire friction circle or not is an example where it is determined whether the behavior state of the vehicle exceeds the set value or not.

When it is determined in S16 that the front-back or left-right G of the vehicle behavior does not exceed the tire friction circle, it is determined whether the acceleration or jerk of the vehicle exceeds the set value or not (S18). For example, it is determined whether the acceleration or jerk in the front-back direction or the left-right direction of the vehicle exceeds the set value set in advance or not.

When it is determined in S18 that the acceleration or jerk of the vehicle does not exceed the set value, a sequence of control processing ends, without newly regenerating a traveling target.

Meanwhile, when it is determined in S14 that the vehicle is deviated from the road, when it is determined in S16 that the front-back or left-right G of the vehicle behavior exceeds the tire friction circle, or when it is determined in S18 that the acceleration or jerk of the vehicle exceeds the set value, it is determined that the control deviation of feedback control exceeds the set value and it is necessary to regenerate a traveling target. Thus, traveling target regeneration processing is carried out (S20).

The traveling target regeneration processing is processing for regenerating a traveling target which becomes a target value for feedback control of vehicle traveling. This regeneration processing is carried out by the control target generation section 21. For example, a traveling trace and a speed pattern of the vehicle which are different from the current traveling target are generated as a traveling target. Then, traveling control is performed in accordance with the new traveling target. After S20 ends, a sequence of control processing ends.

As described above, according to the vehicle control device and the vehicle control method of this embodiment, feedback control is performed for vehicle traveling according to a traveling target, and when the control deviation exceeds the set value at the time of the feedback control, a traveling target is regenerated. Therefore, traveling control can be performed while sufficiently exhibiting the capability of the control system until the control deviation exceeds the set value, and when the control deviation exceeds the set value, a traveling target is regenerated, such that traveling control appropriate for the traveling environment can be performed.

For example, in the case of a device which regenerates a traveling target in a predetermined cycle and performs control, the capability of a feedback control system cannot be sufficiently exhibited, and it is difficult to perform traveling control in accordance with a traveling target set in advance. In contrast, according to the vehicle control device of this embodiment, feedback control is performed in accordance with a traveling target as basic control, such that traveling control can be performed in accordance with a traveling target set in advance.

Then, when it is difficult for the vehicle to travel in accordance with a traveling target at the time of feedback control due to disturbance or the like, a traveling target is reproduced, such that vehicle traveling can be carried out stably. For example, even when a control operation is impossible for the previous traveling target, a new traveling target is regenerated and operation conditions are eased, thereby enabling appropriate traveling.

Figure 3:
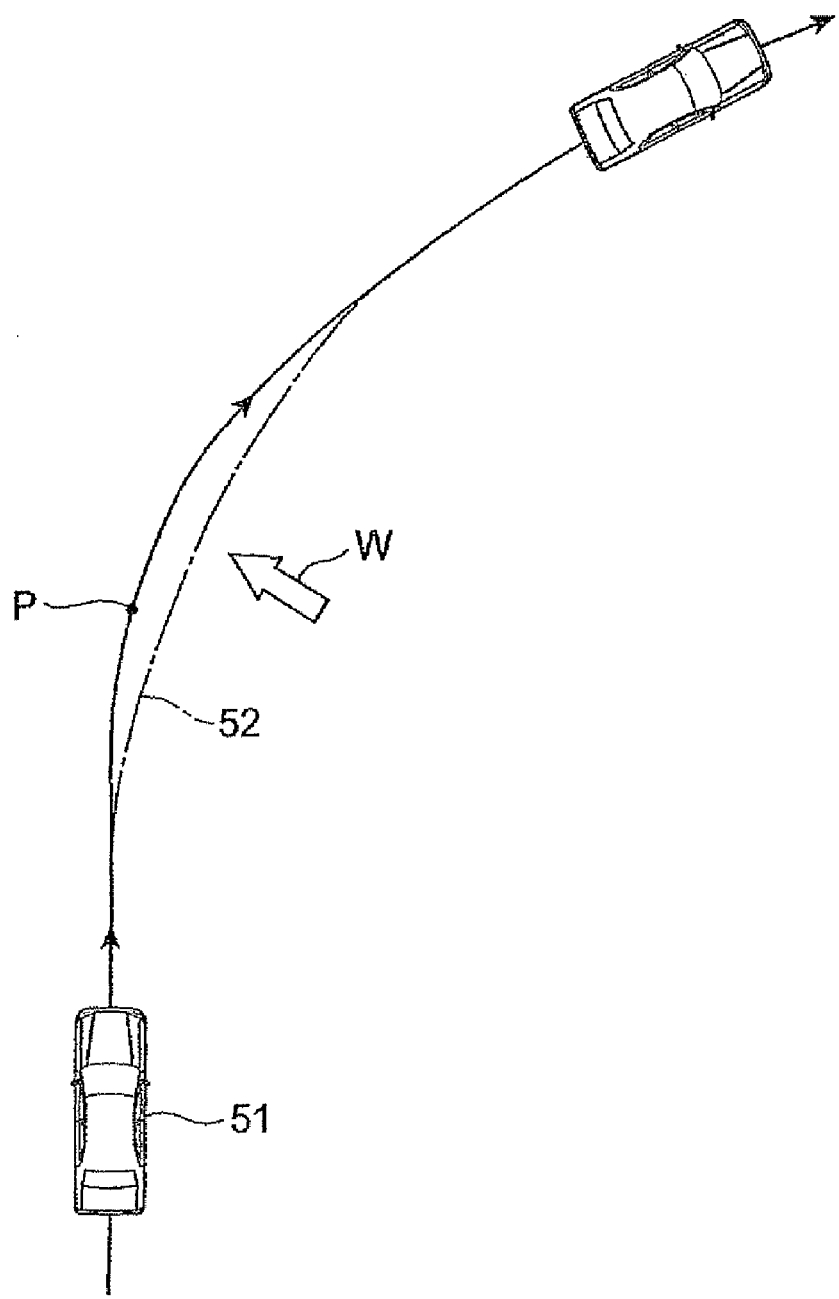
FIG. 3 is a diagram showing a specific example of the operation in the vehicle control device of FIG. 1.

FIG. 3 is a diagram showing a specific example of the operation of the vehicle control device according to this embodiment.

As shown in FIG. 3, when a vehicle 51 is traveling along a target trace 52 which becomes a traveling target, if the vehicle 51 is subjected to a crosswind W, the traveling position P of the vehicle 51 strays from the target trace 52. At this time, when it is determined that the traveling position P of the vehicle 51 cannot be quickly returned to the target trace 52 by feedback control, a traveling target is regenerated. Thus, the traveling position is corrected stably with no sudden steering, such that appropriate vehicle traveling can be carried out.

The above-described embodiment is an example of the vehicle control device and the vehicle control method according to the invention. The vehicle control device and the vehicle control method according to the invention are not limited to the vehicle control device and the vehicle control method according to this embodiment. The vehicle control device and the vehicle control method according to the embodiment may be modified or may be applied to other systems without departing from the scope and spirit of the invention described in the appended claims.

For example, in the control processing of FIG. 2, a case has been described where a traveling target is regenerated when the control deviation of feedback control exceeds the set value, for example, when the traveling position is deviated from the target trace, when the front-back or left-right G of the vehicle behavior exceeds the tire friction circle, or when the acceleration or jerk of the vehicle exceeds the set value. Alternatively, it may be determined whether the control deviation exceeds the set value or not in a portion of the cases when the traveling position is deviated from the target trace, when the front-back or left-right G of the vehicle behavior exceeds the tire friction circle, and the acceleration or jerk of the vehicle exceeds the set value. In addition, a traveling target may be regenerated when other control deviations exceed the set values.

The vehicle control device may be provided in a vehicle which is controlled to travel to follow a preceding vehicle, as well as a fully automatically driven vehicle. The vehicle control device may be applied to a vehicle in which control intervention takes place only in an emergency while no control intervention takes place in a steering device, a traveling drive device, and a braking device under normal conditions.

INDUSTRIAL APPLICABILITY

According to the embodiment of the invention, appropriate traveling control can be performed while the capability of the control system can be sufficiently exhibited at the time of vehicle traveling control.

The invention claimed is:
1. A vehicle control device comprising:
a traveling control unit that performs feedback control for vehicle traveling according to a traveling target, the traveling target including a target traveling trace and a target speed pattern of the vehicle;
a determination unit that determines whether a vehicle traveling state according to the traveling target is a state in which a target following control in accordance with the feedback control is not carried out due to a disturbance predicted according to the vehicle information or not; and
a target regeneration unit that, when the determination unit determines that the vehicle traveling state according to the traveling target is the state in which the target following control in accordance with the feedback control is not carried out due to the disturbance predicted according to the vehicle information, regenerates a new traveling target.

2. A vehicle control method comprising:
a traveling control step of performing feedback control for vehicle traveling according to a traveling target, the traveling target including a target traveling trace and a target speed pattern of the vehicle;
a determination step of determining whether a vehicle traveling state according to the traveling target is a state in which a target following control in accordance with the feedback control is not carried out due to a disturbance predicted according to the vehicle information or not; and
a target regeneration step of, when it is determined in the determination step that the vehicle traveling state according to the traveling target is the state in which the target following control in accordance with the feedback control is not carried out due to the disturbance predicted according to the vehicle information, regenerating a new traveling target.

* * * * *